Jan. 29, 1935.　　　M. DEBREY　　　1,989,084
VOLTAGE REGULATOR
Filed July 1, 1933
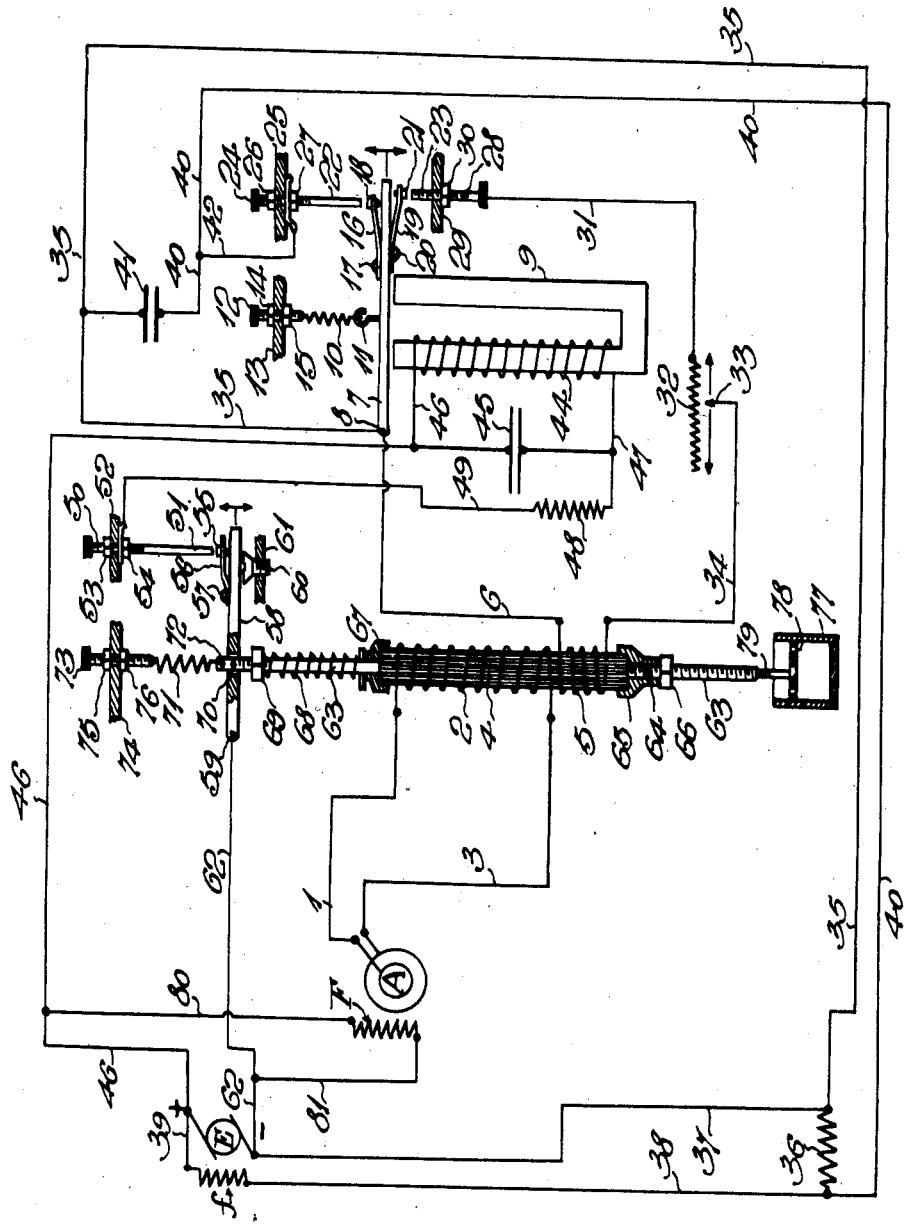
Witness
H. Woodard
Inventor
Michael Debrey
By H. B. Wilson &co.
Attorneys.

Patented Jan. 29, 1935

1,989,084

UNITED STATES PATENT OFFICE 1,989,084

VOLTAGE REGULATOR

Michael Debrey, Burlington, Iowa

Application July 1, 1933, Serial No. 678,683

5 Claims. (Cl. 171—119)

My invention relates to non-inductive voltage regulators for electric generators.

One of the objects of my invention is to provide a regulator for electric generators of alternating current type, which shall be simple in construction and which shall operate to maintain a constant voltage at some point of the system irrespective of the load.

In carrying my invention into practice I provide means whereby a resistance or other controlling device, either in the field circuit of the generator or in the field circuit of the exciter, as the case may be, is, with more or less rapidity, continually cut into and out of operation in such manner as to produce the desired regulation.

A novel feature of my invention relates to means for varying the rapidity of connection and disconnection of the resistance or other controlling device.

For a better understanding of my invention and other objects and purposes attained thereby reference should be had to the following specification in connection with the drawing accompanying the same, wherein one specific form which my invention may assume is disclosed in detail.

The single figure of the drawing is a diagrammatic representation of the voltage regulator, together with the circuits connected thereto.

It will be noted that in said drawing the invention is shown as applied to controlling the voltage of an alternating current generator designated by reference character A. This alternating current generator has a field winding F which is energized by means of an exciter E, having a field winding f. It is obvious that the voltage of the alternator A can be controlled readily by varying the voltage of the exciter E, which supplies the field winding F of the said alternator, and that the voltage of the exciter E in turn can be controlled by varying the current passing through the field winding f of said exciter.

I, therefore, provide a conductor 1 leading from one terminal of the alternator A to a winding 2, here shown as a solenoid and returning to the other terminal of the alternator through the conductor 3. It is obvious, of course, that the alternator A also supplies other circuits, namely, the power consuming circuits fed by said alternator, but this forms no part of the present invention and, therefore, no such other circuits are herein shown.

The solenoid 2 has a movable core 4, preferably laminated, as shown diagrammatically, and a further winding or coil 5 also surrounds said core 4. It will be understood, of course, that while the coil 5 is shown covering a portion of the core 4 beyond that covered by the solenoid 2, this is merely a matter of diagrammatic illustration and in actual practice the coil 5 is preferably wound coextensive with the solenoid 2. A conductor 6 leads from one terminal of the winding 5 to an armature 7 which is free to vibrate about a pivot, spring or other suitable support at 8. The armature 7 has two possible active positions when the device is in action, that is, either pulled down by the core 9 of an electromagnet, to be described in detail later, or released from said pull and drawn upwardly by the adjustable spring 10, which is secured to said armature at any suitable point as by the eyelet 11 attached thereto. The tension of the spring 10 may be adjusted by turning the screw 12 which is secured to any suitable stationary element 13, and the said screw 12 may be fixed in its adjusted position by means of the cooperating nuts 14 and 15.

The armature 7, which preferably is made of, or contains, suitable magnetic material to be attracted by the core 9, carries at its other end two spring contacts, one on each side of the said armature 7, that is, above and below the same, as illustrated.

The upper spring contact 16 is secured to the armature 7 by a screw or rivet at 17 and has a suitable knob or button of suitable corrosion-resisting conducting material 18 such as customarily used for electrical contacts, at its free end, while the lower contact spring 19 is likewise secured to the armature 7 by a screw or rivet 20 and likewise has a contact of corrosion-resisting material 21 at its free end. Each of these contacts, 18 and 21, cooperates with a corresponding adjustable contact 22 and 23, respectively, which are carried by adjusting screws.

The contact 22 is carried by the adjusting screw 24, secured to any suitable stationary part 25 of the regulator and is securable in its adjusted position by means of the nuts 26 and 27, while the contact 23 is supported by the adjustable screw 28, secured to any suitable stationary portion 29 of the regulator and having a suitable lock nut 30 thereon to hold it in its adjusted position.

A conductor 31 leads from the screw 28 to one end of a resistance 32 which is provided with a suitable slidable contact 33 which may be connected at any point thereof, or at least at suitable intervals of said resistance 32, to secure any desired degree of accuracy in varying the resistance in the circuit, which is completed through conductor 34 which leads back to the other terminal of the coil 5.

A further conductor 35, which joins the conductor 6 at the point 8, leads to one terminal of a resistance 36 and at said terminal of the resistance 36 is connected to another conductor 37 leading to one terminal or brush of the exciter E. It will be noted that the field circuit of the exciter E is completed through said conductor 37, the resistance 36, conductor 38, field winding f and conductor 39 to the other brush of the exciter E. These brushes or terminals, for convenience of description, are designate by + and — although it is obvious that it is not necessary that the polarities be in the positions designated.

A further circuit leads from one terminal of the resistance 36 through the conductor 40 to one terminal of a condenser 41 and another conductor 42 is connected to said conductor 40 and leads to the screw 24 and, therefore, to the contact 22. The other terminal of the resistance 36 is connected to the other side of the condenser 41 through conductor 35, thus connecting the said condenser 41 in parallel with said resistance 36.

It is obvious that when the armature 7 is in its uppermost position, so that the spring contact 18 touches the screw contact 22, both the condenser 41 and the resistance 36 will be short circuited through said armature and contacts and the connecting wires 42, 35, and 40. When the armature, however, is in its lowermost position, this connection between the contacts 18 and 22 will be broken and another circuit established instead, through the spring contact 21 and the screw contact 23, this circuit including the conductor 31, the active portion of the resistance 32, the slider 33, the conductor 34, the winding 5, the conductor 6 and armature 7 and leading back through the said two contacts 21 and 23, thus closing a circuit containing mainly the winding 5, which is a source of power, and a part of the resistance 32, which is a work circuit or power consuming device.

Referring now to the magnetic core 9 and the winding 44 surrounding a portion of the same, it will be noted that said winding 44 is connected in parallel with a condenser 45 by means of conductors 46 and 47 respectively. The conductor 46 continues to one terminal of the exciter E, here indicated as the + terminal, whereas the conductor 47 is connected to one terminal of the resistance 48, the other terminal of which is connected, through the conductor 49, to a screw 50 carrying the contact element 51.

This contact screw 50 passes through any suitable stationary portion 52 of the device and has nuts 53 and 54 cooperating therewith to secure it in its adjusted position. The contact 51 cooperates with the contact 55, carried by a spring 56, secured by a screw or rivet 57 to a bar 58, which is pivoted at 59 for up-and-down movement as indicated. The downward movement of the bar 58 may be limited by any suitable adjustable abutment, such as a screw 60, threaded into any suitable stationary portion 61 of the device, whereby the head of the screw will serve to limit the downward motion of the bar 58.

When the bar 58 is in its upper position, so that the contact 55 makes electrical connection with the contact 51, carried by the screw 50, the circuit will be completed through the conductor 62 which leads to the — terminal of the exciter E as shown, so that when such contact 55 touches the contact 51 the exciter E will energize the winding 44 through the resistance 48 and thus magnetize the core 9 which is surrounded by said winding.

The bar 58 is caused to move up or down by being connected to the core 4 in the solenoid 2, already described. This core 4 is held by the rod 63 which is threaded, as shown at 64, and has a cupped washer 65 engaging over said threads and supporting one end of the core 4, a nut 66 serving to adjust the said cupped washer 65 in any desired position. A cupped washer 67 encloses the upper end of the core 4 and is also engaged over the rod 63, a spring 68 bearing against a nut 69 threaded upon said rod exerting a downward force against said washer 67.

The rod 63 is pivotally secured to the bar 58 by the pivot 70 and a supporting spring 71 is engaged at one end through an aperture 72 in the upper end of the rod 63 and is itself supported by the lower end of the adjusting screw 73, which, like the other adjusting screws, may be secured to any stationary portion 74 of the device and has cooperating nuts 75 and 76 for holding the same in adjusted position. A bearing 77 is preferably provided, having therein a disc 78 secured to the lower end of the rod 63 by means of a short stem 79 threaded into the lower end of said rod 63, and serves to support the core centrally of the solenoid without impeding its freedom of movement. The field winding F of the alternator A is connected to the terminals of the exciter E through conductors 80 and 81, respectively.

In order to understand the operation of the device it should be noted that when the armature lever 7 is in its upper position it will short circuit the condenser 41 and the resistance 36 which is connected in parallel thereto, thus decreasing the resistance in the field circuit of the exciter E and, therefore, increasing the voltage delivered by the said exciter. This will, of course, correspondingly increase the voltage generated by the generator A, and consequently the upward pull exerted by the solenoid 2, and at certain times also will increase the pull exerted by the core 9 energized by the winding 44, whenever the contacts 51 and 55 are connected with one another, whereby the exciter voltage is applied to the winding 44 on the said core 9.

On the other hand, when the circuit is broken at the contacts 18 and 22, by reason of a downward pull on the armature 7 due to sufficient energization of the core 9, another circuit will be completed through the contacts 21 and 23, this circuit including the winding 5 and such portion of the resistance 32 as happens to be in circuit, in correspondence with the position of the slider 33 at the moment in question. This slider is adjustable manually to vary the portion of resistance 32 thus placed in service. It will be noted that the winding 5 acts as the secondary winding of a transformer whereof the solenoid 2 is the primary winding, said winding 2 being energized directly from the alternating current supplied by the alternator A.

It has been found that as a result of this combination of windings with the resistance 32, an oscillation or vibration of the armature 7 will be produced, the frequency of such oscillation being dependent upon the amount of resistance included in series in the circuit. In other words, an adjustment of the slider 33 along the resistance 32 will vary the frequency of oscillation of the armature 7. The core 4 of the solenoid 2 will, of course, enter to varying distances within said solenoid and may be adjusted within certain limits by shifting the nut 66 upon the screw threads 64 on the lower end of the rod 63, and by reason of being inserted to a greater or less distance in said solenoid 2 will vary the voltage induced in the winding 5, as well as the amount of power transferred thereto.

By a combination of the various electromagnetic forces thus produced a condition of unstable equilibrium of the lever 58 and armature 7 results and constant vibration of these parts takes place in an effort to restore proper equilibrium. By properly adjusting the various contact screws 50, 24 and 28, as well as the screws 12 and 73, which adjust the tensions of the springs 10 and 71 controlling the vibratory members 7 and 58 respectively, and by suitably adjusting the position of the core 4 in the solenoid 2 by means of the nut 66 and also adjusting the sliding contact 33 on the resistance 32, it will be seen that the voltage delivered by the alternator A may be controlled within narrow limits, due to the fact that the vibrations of the armature 7 will cause the more or less rapid short circuiting of the resistance 36 which is in series with the field winding *f* of the exciter.

The condensers 41 and 45 assist in preventing sparking at the contact points in the circuits protected thereby and the bearing 77 with the disc 78 therein, as stated, will serve to maintain the proper central position of the core 4 and rod 63, while permitting movement thereof. It should be clearly understood that although the elements 77 and 78 have the general appearance of a dash pot as ordinarily diagrammatically illustrated, these elements in no sense constitute such dash pot, in fact the disc 78 has a number of perforations therein, so as to prevent any undue oil resistance due to the vertical fluctuations of position of said disc within the bearing member 77. In other words, the elements 77 and 78 jointly merely constitute a bearing and not a vibration damper in any sense.

The condenser 41 is not in itself new as used herein, but the condenser 45, on the other hand, serves a novel function. It will be noted that this condenser 45, in parallel with the winding 44, constitutes a circuit wherein the inductance of the winding 44 is offset by the capacity of the condenser, thus providing a practically non-inductive combination, which will respond more quickly than would the inductance 44 alone.

Assuming that the generator and exciter are in operation and each properly energized it is clear that the coil 2 will carry practically the entire voltage produced by the alternator A and being thus energized it will magnetize the core 4 which will thereupon "float" within the coil with the gravitational pull thereon practically neutralized by the upward magnetic pull. Upon turning the nut 66 on the rod 63 to the right or to the left the cupped washer 65 will be moved upward or allowed to descend, because the spring 68 at all times pushes downwardly against the cupped washer 67 at the other end of the core 4. Assuming that the voltage is higher than desired, the nut 66 should be turned in a direction which will allow the core 4 and associated parts to slide downward on the rod 63, whereupon a point will be reached low enough to bring the said core to a certain extent out of the magnetic field produced by the solenoid 2 and thereupon this magnetic field will exert an upward pull on the core 4, thus moving the lever 58 upward far enough to close the contacts 51 and 55, thereby establishing the circuit from the exciter through the winding 44 on the core 9.

When the core 9 is thus magnetized it will attract the armature 7, pulling it downward and breaking the circuit at the contacts 18 and 22, thus leaving the resistance 36 in series in the field circuit of the exciter E. This will cause a rapid drop in the exciter voltage, which in turn affects the magnetic field of the solenoid 2 so that the core 4 will fall downward, carrying along the lever 58, sometimes far enough to reach the head of the abutment screw 60. When the lever 58 falls, the contacts 51 and 55 are separated, thus breaking the energizing circuit of the coil 44 and demagnetizing the core 9 and thereby allowing the armature 7 to move upwardly in response to the spring 10, opening the circuit at the contacts 21 and 23, and causing contacts 18 and 22 to be connected. It will be seen that the result is to short circuit the resistance 36, thus decreasing the resistance in the field circuit of the exciter E and rapidly increasing the exciter voltage, thereby causing the voltage of the alternator A to rise correspondingly, until the core 4 again pushes the lever 58 upward to close the contacts 51 and 55, thereby again causing the exciter to magnetize the core 9, this operation thus continuing periodically for an indefinite time, as long as the device is in action. It will be noted that when the core 4 is at its upper position the armature 7 is in its lowermost position and vice versa, and this is the action which takes place, as stated, at a frequency which may be varied between 50 and 1000 per minute.

It is, therefore, clear what results occur due to the oscillation of the armature 7. This armature has a downward limit of motion set by the poles of the core 9, as well as by the contacts 18 and 22. Assuming now that the core 4 of the solenoid 2 has been drawn up, which means that the circuit through the exciter and coil 44 is closed, the armature 7 will be attracted downward by the core 9, thus closing the circuit at contacts 21 and 23 and causing the winding 5 to be short circuited, more or less, dependent upon the setting of slide 33 on the resistance 32. This winding 5, acting as a transformer winding, will tend to reduce the current flowing in the solenoid 2, thus hastening the sudden drop of the core 4 so as to disconnect the contacts 51 and 55 before the electromotive force generated by the alternator drops too much below normal. As the armature 7 again moves up, opening the circuit at the contacts 21 and 23, this, by opening the circuit through the coil 5, means that the core 4 now receives a further upward pull from the coil 2 due to the fact that the normal current of the coil 2 is quickly reestablished and the core 4 again moves upward to reestablish the connection at the contacts 51 and 55.

I have found that, contrary to what would ordinarily be expected in transformer circuits, upon short circuiting, or partially short circuiting, the winding 5, the current in solenoid 2 is in fact decreased instead of being increased and this is an important feature in the operation of my regulator. I offer no theory herein as to why this apparently paradoxical effect is secured, but merely state the fact that I have found this result to take place and that it assists in providing a rapid and delicate response of the core 4, whereby a shifting of the slider 33 along the resistance 32 will serve to adjust the frequency of vibration of the armature 7 within wide limits, so that the coil 5 acts as a time element winding. The frequency of oscillation of the armature 7 may be varied from, say, 50 to 1000 vibrations per minute, by suitable adjustment of slider 33 on the resistance 32, thus making it possible to set the rate of vibration properly to take care of voltage ripples of practically any frequency ordinarily encountered.

Having disclosed my invention and described in detail one particular embodiment thereof, I desire it to be understood that my invention is, of course, not limited to the particular embodiment disclosed, but that the limitations thereof are to be determined solely by the following

I claim:

1. A voltage regulator comprising a solenoid having a core, a secondary winding in inductive relationship to said solenoid, a resistance in circuit with said secondary winding, a circuit maker and breaker interposed in series with said winding and resistance, a lever arranged to be actuated by said core when moving in the magnetic field of the solenoid and means controlled by said lever and including an electromagnet for periodically actuating the said circuit maker and breaker.

2. A voltage regulator comprising a solenoid having a core, a secondary winding in inductive relationship to said solenoid, an adjustable resistance in circuit with said secondary winding, a circuit maker and breaker interposed in series with said winding and resistance, a lever arranged to be actuated by said core when moving in the magnetic field of the solenoid, means controlled by said lever and including an electromagnet for periodically actuating the said circuit maker and breaker, and a condenser connected in parallel with the winding of the said electromagnet to partially offset the inductance thereof.

3. A voltage regulator comprising a solenoid having a core, a secondary winding in inductive relationship to said solenoid, a resistance in circuit with said secondary winding, circuit maker and breaker contacts interposed in series with said winding and resistance, a lever arranged to be actuated by said core when moving in the magnetic field of the solenoid and means controlled by said lever and including an electromagnet having an armature for periodically actuating the said circuit maker and breaker contacts, additional circuit maker and breaker contacts also controlled by said armature, and a resistance cut into and out of circuit by said additional circuit maker and breaker contacts, and adapted to control an electrical circuit.

4. A voltage regulator comprising a solenoid having a core, a secondary winding in inductive relationship to said solenoid, a variable resistance in circuit with said secondary winding, circuit maker and breaker contacts interposed in series with said winding and said variable resistance, a lever arranged to be actuated by said core when moving in the magnetic field of the solenoid and means controlled by said lever and including an electromagnet having an armature for periodically actuating the said circuit maker and breaker contacts, a second set of circuit maker and breaker contacts also controlled by said armature and a resistance cut into and out of circuit by said second set of circuit maker and breaker contacts, and adapted to control an electrical circuit.

5. A voltage regulator comprising a solenoid having a core, a secondary winding in inductive relationship to said solenoid, an adjustable resistance in circuit with said secondary winding, a circuit maker and breaker interposed in series with said winding and resistance, a lever arranged to be actuated by said core when moving in the magnetic field of the solenoid and means controlled by said lever and including an electromagnet for periodically actuating the said circuit maker and breaker.

MICHAEL DEBREY.